United States Patent Office 2,968,669
Patented Jan. 17, 1961

2,968,669

DIALKYL S(2-CYANOALKYL)PHOSPHORO-THIOLOTHIONATES

Marvin A. McCall and Harry W. Coover, Jr., Kingsport, Tenn., assignors to Eastman Kodak Company, Rochester, N.Y., a corporation of New Jersey No Drawing. Filed Feb. 24, 1959, Ser. No. 794,798

15 Claims. (Cl. 260—461)

This invention relates to new organophosphorus compounds and to their method of preparation. In a specific aspect this invention relates to the preparation of new organophosphorus compounds by the reaction of dialkyl phosphorothiolothionates with certain unsaturated nitriles and to the products of this process.

Organophosphorus compounds have evidenced marked utility and importance in many fields. For example, they have been employed as insecticides, fungicides, pesticides and in related uses. Consequently, it is of considerable importance to discover new and useful organophosphorus compounds and to have a new process for the production of organophosphorus compounds. Therefore, it is an object of this invention to provide new and useful organophosphorus compounds. It is another object of this invention to provide a novel method for preparing the new and useful organophosphorus compounds. It is still another object of this invention to provide new and valuable insecticides that can be used in various insecticidal compositions.

In accordance with this invention it has been found that new organophosphorus compounds, useful as insecticides, can be prepared by reacting dialkyl and substituted dialkyl phosphorothiolothionates with certain unsaturated nitriles. The new products of this invention have the structural formula:

$$\begin{array}{c} RO \\ \diagdown \\ R_1O \end{array} \!\!\!\! \begin{array}{c} S \\ \| \\ P-S-CH_2-CH-R_2 \end{array} \begin{array}{c} CN \\ | \\ \end{array}$$

wherein R and $R_1$ are selected from the group consisting of lower alkyl, lower chloroalkyl and lower alkoxy-lower alkyl and $R_2$ is selected from the group consisting of di-lower alkylamino, piperidyl and radicals having the formulas:

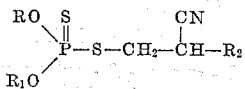    $-CH_2SO_2R_5$ and

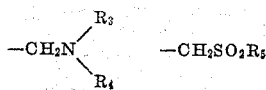

wherein $R_3$ and $R_4$ are selected from the group consisting of hydrogen, lower alkyl, acetyl, carbamyl, and lower alkylsulfonyl, $R_5$ is selected from the group consisting of lower alkoxy, amino, and di-lower alkylamino, and $R_6$ and $R_7$ are selected from the group consisting of lower alkoxy and di-lower alkylamino.

In preparing the products of this invention, dialkyl or substituted dialkyl phosphorothiolothionates having the following structural formula are used:

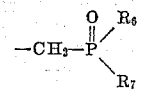

wherein R and $R_1$ are radicals having the definition set forth above. The phosphorothiolothionates are reacted with certain unsaturated nitriles having the structural formula:

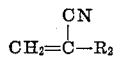

wherein $R_2$ is a radical having the definition set forth above.

In the practice of this invention we prefer to add one of the reactants gradually to a reactor containing the other reactant. For example, the unsaturated nitrile can be added gradually to a reactor containing the phosphorothiolothionate. Alternatively, however, the reverse procedure of addition of reactants can be used and the dialkylphosphorothiolothionate can be added to a reactor containing the organic ester. In those instances where polymerization of the unsaturated nitrile must be avoided, addition of the stabilized vinyl compound to the phosphorothiolothionate is preferred. Normally it is desirable to employ a reactor provided with adequate means of agitation and, since the reaction is quite exothermic, it is also desirable to employ a reactor that is provided with adequate cooling means.

The operable temperature range for the reaction is generally from —25 to 150° C. and the preferred temperature range is from 25 to 100° C. However, it will be realized that in some instances temperatures outside this range can be employed. The reaction time usually varies from 0.5 to 8 hours, but longer and shorter reaction periods are sometimes used. It is unnecessary to employ a catalyst for the reaction since the dialkylphosphorothiolothionate will react with these unsaturated nitriles in the absence of a catalyst. If it is considered desirable to employ a catalyst, there are certain catalysts that can be used, for example, the tertiary amines, such as triethyl amine, and the like.

Ordinarily, it is not necessary to employ a solvent for the reaction but in some instances solvents are desirable. Among the solvents that can be used are normally liquid aliphatic and aromatic hydrocarbons such as pentane, heptane, octane, benzene, toluene, the xylenes and the like, chlorinated derivatives of the above-mentioned hydrocarbons as well as the common ether and ester solvents. It is preferable to carry out the reaction using equimolar quantities of the reactants. However, it is within the scope of our invention to use any molar ratio of reactants.

The following examples are illustrative of the compounds within the scope of this invention, their method of preparation and their utility as insecticides.

EXAMPLE 1

*O,O-diethyl S(2-cyano-2-dimethylaminoethyl) phosphorothiolothionate*

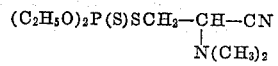

α-Dimethylaminoacrylonitrile (0.1 mole), containing a small amount of hydroquinone as polymerization inhibitor, was added dropwise to O,O-diethylphosphorothiolothionate with stirring. The reaction was exothermic. The temperature was held below 60° C. by controlling the rate of addition. After the addition was complete, the reaction mixture was stirred for 1 hr. at room temperature and then heated on a steam bath for 15 minutes. The product was a dark oil which had strong pesticidal activity.

EXAMPLE 2

*O,O-dimethyl S(2-cyano-2-dimethylaminoethyl) phosphorothiolothionate*

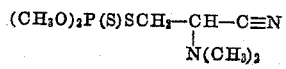

This compound was prepared from O,O-dimethylphosphorothiolothionate (0.1 mole) and α-dimethylaminoacrylonitrile (0.1 mole) in the same manner as described in Example 1 above. The product was a dark oil with very active pesticidal properties.

EXAMPLE 3

*O,O-bis(2,2,2-trichloroethyl) S-(2-cyano-2-dimethylaminoethyl)phosphorothiolothionate*

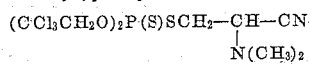

This compound was prepared from O,O-bis(2,2,2,-trichloroethyl)phosphorothiolothionate (0.1 mole) and α-dimethylaminoacrylonitrile (0.1 mole) according to the method described in Example 1. The dark oily product was an active pesticide.

EXAMPLE 4

*O-methyl, O-ethyl S-(2-cyano-2-dimethylaminoethyl)-phosphorothiolothionate*

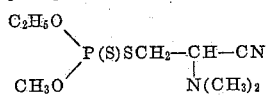

This compound was prepared by reacting O-ethyl, O-methyl phosphorothiolothionate (0.1 mole) with α-dimethylaminoacrylonitrile (0.1 mole) in the same manner as described in Example 1. The dark oily product had high pesticidal activity.

EXAMPLE 5

*O,O-diethyl S-(2-cyano-2-piperidylethyl)phosphorothiolothionate*

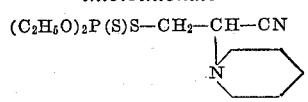

This compound was prepared from O,O-diethyl phosphorothiolothionate (0.1 mole) and α-piperidylacrylonitrile (0.1 mole) according to the procedure given in Example 1 except that dry benzene was used as the diluent and a few drops of triethyl amine was used as catalyst for the reaction. The product was obtained as a dark oil material after vacuum stripping to remove the benzene solvent.

EXAMPLE 6

*O,O-bis-(2-methoxyethyl) S-(2-cyano-3-diethylaminopropyl)phosphorothiolothionate*

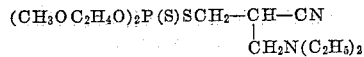

This compound was prepared from O,O-bis(methoxyethyl)phosphorothiolothionate (0.1 mole) and α-(diethylaminomethyl)acrylonitrile (0.1 mole) according to the procedure given in Example 1.

EXAMPLE 7

*O,O,diethyl S-(2-cyano-3-acetaminopropyl)phosphorothiolothionate*

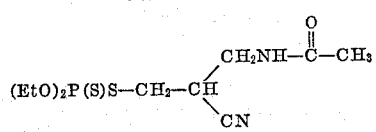

This active pesticide was prepared from O,O-diethyl phosphorothiolothionate (0.1 mole) and α-(acetaminomethyl)acrylonitrile (0.1 mole) according to Example 1 except that a catalytic amount of triethyl amine was added to the mixture before it was heated on the steam bath for 15 minutes.

EXAMPLE 8

*O,O - diethyl S-[2-cyano-3-(N-methylacetamino)propyl]-phosphorothiolothionate*

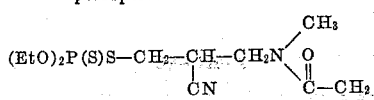

This product was prepared from O,O-diethyl phosphorothiolothionate (0.1 mole) and α-(acetaminomethyl)-acrylonitrile (0.1 mole) according to Example 1.

EXAMPLE 9

*O,O-diethyl S-(2-cyano-3-ureidopropyl)phosphorothiolothionate*

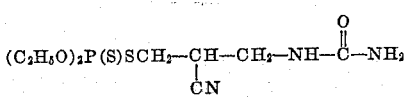

This compound was prepared from O,O-diethyl phosphorothiolothionate (0.1 mole) and α-ureidomethyl acrylonitrile (0.1 mole) according to the procedure of Example 1. The product was a dark yellow oil.

EXAMPLE 10

*O,O-diethyl S-[2-cyano-3-(methanesulfonamido)propyl]-phosphorothiolothionate*

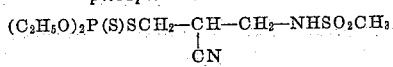

This compound was prepared from O,O-diethyl phosphorothiolothionate (0.1 mole) and α-methane sulfonamidomethyl acrylonitrile according to the procedure of Example 1. The product was a dark oil.

EXAMPLE 11

*O,O-diethyl S[2-cyano-3-(methoxysulfonyl)propyl]phosphorothiolothionate*

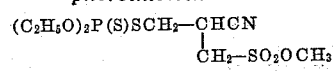

This compound was prepared from O,O-diethyl phosphorothiolothionate (0.1 mole) and α-methoxysulfonylmethyl acrylonitrile (0.1 mole) according to the procedure given in Example 1. The product was a dark oil.

EXAMPLE 12

*O,O-dimethyl S(2 - cyano - 3 - sulfonamidopropyl)phosphorothiolothionate*

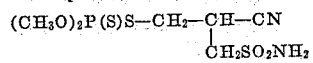

This compound was prepared from O,O-dimethyl phosphorothiolothionate (0.1 mole) and α-sulfonamidomethyl acrylonitrile (0.1 mole). The product was a dark brown oil.

EXAMPLE 13

*O,O - dimethyl S[2-cyano-3-(N,N-dimethylsulfonamido)-propyl]phosphorothiolothionate*

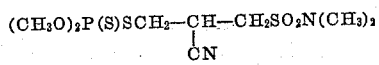

This compound was obtained from the reaction of O,O-dimethyl phosphorothiolothionate (0.1 mole) and α-(N,N-dimethyl sulfonamidomethyl) acrylonitrile (0.1 mole) according to the procedure of Example 1.

EXAMPLE 14

*O,O - diethyl S[2-cyano-3-(dimethylphosphono)propyl]-phosphorothiolothionate*

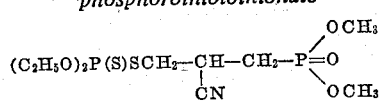

This dark oily material was prepared from the reaction of 0.1 mole of O,O-diethyl phosphorothiolothionate and 0.1 mole of dimethyl 2-cyanopropene-3-phosphonate.

EXAMPLE 15

*O,O-diethyl S[2-cyano-3-(N,N,N',N'-tetramethyldiamido-phosphono)propyl]phosphorothiolothionate*

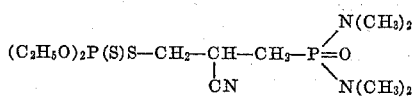

This compound was prepared from the reaction of 0.1 mole of O,O-diethyl phosphorothiolothionate and 0.1 mole of N,N,N',N'-tetramethyl 2-cyanopropene-3-phosphondiamide according to the general procedure of Example 1.

EXAMPLE 16

Use of compounds as insecticides

Tests against mites were carried out in the following manner. Acetone solutions containing 1% of the candidate compounds were prepared and diluted with water to give solutions of the desired concentration for testing. Two heavily infested bean leaves containing adult two-spotted mites (*Tetranychus bimaculatus* Harvey) were carefully dipped in the above solutions and dried in a gentle air stream. The leaves were then placed on damp paper toweling in petri dishes and observed after 24 hours for mortality among the adult mites.

It should be noted that tests using acetone-water solutions (containing none of the toxicant) kill none of the mites.

TABLE 1

| Toxicant | Conc. of Toxicant in p.p.m. | Percent Kill of Mites |
| --- | --- | --- |
| 1. O,O-Diethyl S-(2-cyano-2-dimethylaminoethyl)phosphorothiolothionate (Example 1) | 100<br>30<br>10 | 100<br>99<br>95 |
| 2. O,O-Dimethyl S-(2-cyano-2-dimethylaminoethyl)phosphorothiolothionate (Example 2) | 100<br>30<br>10 | 100<br>100<br>98 |
| 3. O,O-Bis(2,2,2-trichloroethyl) S-(2-cyano-2-dimethylaminoethyl)phosphorothiolothionate (Example 3) | 100<br>30<br>10 | 99<br>90<br>89 |
| 4. O-Methyl, O-ethyl S-(2-cyano-2-dimethylaminoethyl)phosphorothiolothionate (Example 4) | 100<br>30<br>10 | 100<br>90<br>89 |
| 5. O,O-Diethyl S-(2-cyano-2-pipridylethyl)-phosphorothiolothionate (Example 5) | 100<br>30<br>10 | 100<br>92<br>37 |
| 6. O,O-Bis-(2-methoxyethyl) S-(2-cyano-3-diethylaminopropyl) phosphorothiolothionate (Example 6) | 100<br>30<br>10 | 100<br>90<br>85 |

The products produced in Examples 7 to 15 also showed strong pesticidal activity against mites.

Although the invention has been described in considerable detail with reference to certain preferred embodiments thereof, variations and modifications can be effected within the spirit and scope of the invention as described hereinabove and as defined in the appeded claims.

We claim:

1. Organophosphorus compounds having the structural formula:

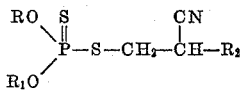

wherein R and $R_1$ are selected from the group consisting of lower alkyl, lower chloroalkyl and lower alkoxy-lower alkyl and $R_2$ is selected from the group consisting of di-lower alkylamino, N-piperidyl and radicals having the formulas:

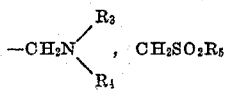

and

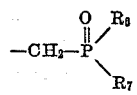

wherein $R_3$ and $R_4$ are selected from the group consisting of hydrogen, lower alkyl, acetyl, carbamyl, and lower alkylsulfonyl, $R_5$ is selected from the group consisting of lower alkoxy, amino, and di-lower alkylamino, and $R_6$ and $R_7$ are selected from the group consisting of lower alkoxy and di-lower alkylamino.

2. Organophosphorus compounds having the structural formula:

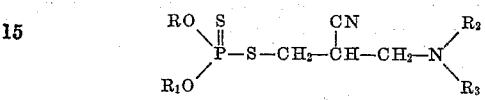

wherein R and $R_1$ are selected from the group consisting of lower alkyl, lower chloroalkyl and lower alkoxy-lower alkyl and $R_2$ and $R_3$ are selected from the group consisting of hydrogen, lower alkyl, acetyl, carbamyl and lower alkylsulfonyl.

3. Organophosphorus compounds having the structural formula:

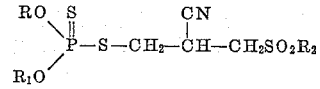

wherein R and $R_1$ are selected from the group consisting of lower alkyl, lower chloroalkyl and lower alkoxy-lower alkyl and $R_2$ is selected from the group consisting of lower alkoxy, amino, and di-lower alkylamino.

4. Organophosphorus compounds having the structural formula:

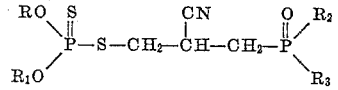

wherein R and $R_1$ are selected from the group consisting of lower alkyl, lower chloroalkyl and lower alkoxy-lower alkyl and $R_2$ and $R_3$ are selected from the group consisting of lower alkoxy and di-lower alkylamino.

5. The organophosphorus compound having the structural formula:

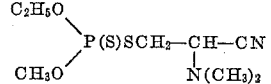

6. The organophosphorus compound having the structural formula:

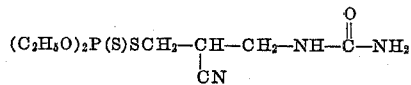

7. The organophosphorus compound having the structural formula:

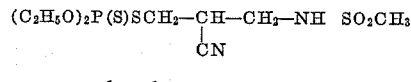

8. The organophosphorus compound having the structural formula:

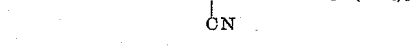

9. The organophosphorus compound having the structural formula:

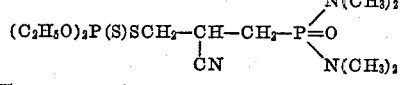

10. The process for producing organophosphorus compounds of claim 1 which comprises reacting a phosphorothiolothionate having the structural formula:

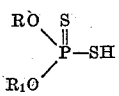

wherein R and $R_1$ are selected from the group consisting of lower alkyl, lower chloroalkyl and lower alkoxy-lower alkyl with an unsaturated nitrile having the structural formula:

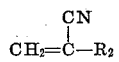

wherein $R_2$ is selected from the group consisting of di-lower alkylamino, N-piperidyl and radicals having the formulas:

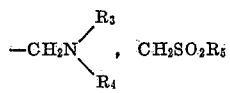

and

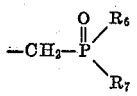

wherein $R_3$ and $R_4$ are selected from the group consisting of hydrogen, lower alkyl, acetyl, carbamyl, and lower alkylsulfonyl, $R_5$ is selected from the group consisting of lower alkoxy, amino, and di-lower alkylamino, and $R_6$ and $R_7$ are selected from the group consisting of lower alkoxy and di-lower alkylamino.

11. The process for producing the organophosphorus compound of claim 5 which comprises reacting O-methyl, O-ethyl, S-(2-cyano-2-dimethylaminoethyl)phosphorothiolothionate with α-dimethylaminoacrylonitrile.

12. The process for producing the organophosphorus compound of claim 6 which comprises reacting O,O-diethyl phosphorothiolothionate with α-ureidomethyl acrylonitrile.

13. The process for producing the organophosphorus compound of claim 7 which comprises reacting O,O-diethyl phosphorothiolothionate with α-methane sulfonamidomethyl acrylonitrile.

14. The process for producing the organophosphorus compound of claim 8 which comprises reacting O,O-dimethyl phosphorothiolothionate with α-(N,N-dimethyl sulfonamidomethyl)acrylonitrile.

15. The process for producing the organophosphorus compound of claim 9 which comprises reacting O,O-diethyl phosphorothiolothionate with N,N,N',N'-tetramethyl 2-cyanopropene-3-phosphondiamide.

No references cited.